(12) United States Patent
Kyle

(10) Patent No.: US 9,881,254 B2
(45) Date of Patent: Jan. 30, 2018

(54) TREE STRUCTURED DATA TRANSFORM, BY DETERMINING WHETHER A PREDICATE OF A RULE MATCHES A GIVEN NODE IN A SET AND APPLYING A FUNCTION RESPONSIVE TO THE MATCH

(71) Applicant: INTERNATIONAL BUSINESS MACHINES CORPORATION, Armonk, NY (US)

(72) Inventor: Bryan J. Kyle, Victoria (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 653 days.

(21) Appl. No.: 13/684,333

(22) Filed: Nov. 23, 2012

(65) Prior Publication Data
US 2013/0138597 A1    May 30, 2013

(30) Foreign Application Priority Data
Nov. 30, 2011    (CA) ...................................... 2760321

(51) Int. Cl.
G06N 5/02      (2006.01)
G06F 17/22    (2006.01)

(52) U.S. Cl.
CPC ............. G06N 5/02 (2013.01); G06F 17/227 (2013.01); G06F 17/2247 (2013.01)

(58) Field of Classification Search
CPC . G06F 17/00; G06F 7/00; G06F 17/28; G06F 17/2247; G06F 17/211; G06F 17/227
(Continued)

(56) References Cited

U.S. PATENT DOCUMENTS 7,076,729 B2    7/2006    Mani et al.
2002/0016801 A1*   2/2002    Reiley et al. ................. 707/523
(Continued)

OTHER PUBLICATIONS

Nick Parlante, Copyright 2000, Stanford, All pages. http://cslibrary.stanford.edu/109/TreeListRecursion.html.*
(Continued)

*Primary Examiner* — Cesar Paula
*Assistant Examiner* — Benjamin Norris
(74) *Attorney, Agent, or Firm* — Cuenot, Forsythe & Kim, LLC

(57) ABSTRACT

A transformation process determines whether a predicate of a rule matches a given node of tree structured data containing a set of nodes and, when the predicate of a rule matches the given node, applies a function of an identified rule to the node to generate a compound result and an interim mutated output document, and when the compound result contains a next node, determines whether the next node is compared with the predicate of a next rule. The transform process includes determining that the next node is processed by a next rule, using the interim mutated output document as input, and determining whether a predicate of a rule matches the next node in a set of nodes. When the predicate of a rule matches the next node, a function of an identified rule is applied to the next node to generate a compound result and interim mutated output document. When the compound result does not contain a next node, a final mutated output document is generated.

20 Claims, 7 Drawing Sheets

(58) Field of Classification Search
USPC .................................................. 715/236, 239
See application file for complete search history.

(56) References Cited

U.S. PATENT DOCUMENTS

2004/0268249 A1* 12/2004 Fennelly ........... G06F 17/30569
715/236
2010/0199172 A1 8/2010 Fuchs et al.

OTHER PUBLICATIONS

Electrofriends, captured Apr. 15, 2015, All pages http://electrofriends.com/source-codes/software-programs/cpp-programs/cpp-data-structure/c-program-for-creation-and-traversal-of-a-binary-tree/.*
Dvorakova, J., "Automatic Streaming Processing of XSLT Transformations Based on Tree Transducers," Informatica, vol. 32, No. 4, Nov. 2008, pp. 373-382, Slovenian Society Informatika.

* cited by examiner

Transform system 300

FIG. 5

```
                                            502
Let node = document.documentElement _____/
While node exists:
    Let last = node
    For each rule r in rules: _____  504
        If r.predicate matches node: _____ 506
            Let result = the result of applying r.function to node _____ 508
            Let next = result.next
            Let instruction = result.instruction
            If instruction is break: _____ 510
                Let node = next
                Break from For loop
            If instruction is continue: _____ 512
                Let node = next If last is node:
        Let node = next node in document order after node
```

```
                                                        602
# Remove all CSS styling from all nodes
*[style]: function(n):                      604
        Remove style attribute of n                     606
        Return node: n, instruction: continue accept <a>, <b>, <i>, <u>, <p> elements         608
a, b, i, u, p: function(n):
        Let r = next node in document order after n
        Return node: r, instruction: break convert <div> into <p>              610
div: function(n)
        Let r = new <p> element                612
        Move all children of n to be children of r
        Insert r before n as a child of a parent of n
        Remove n from parent of n
        Return node: r, instruction: break
```

600

TREE STRUCTURED DATA TRANSFORM, BY DETERMINING WHETHER A PREDICATE OF A RULE MATCHES A GIVEN NODE IN A SET AND APPLYING A FUNCTION RESPONSIVE TO THE MATCH

CROSS-REFERENCE TO RELATED APPLICATIONS

This application claims the benefit of Canada Application Number 2760321 filed on Nov. 30, 2011, which is fully incorporated herein by reference.

BACKGROUND

Transforming data from one form into another desired form is a typical occurrence in a data processing system. However, in one example, transforming data of an arbitrary collection of markup from one form into another form can be difficult to complete efficiently.

Presently there exist methods to transform extensible markup language (XML) data from one form to another using extensible stylesheet language transformations (XSLT), which is a declarative, XML-based language, used for the transformation of XML documents. XSLT processing, using the XSLT engine is however not recursive. Using the XSLT process, the output of one template will not be accordingly processed by other templates within the same process. Recursion in XSLT must be accomplished by chaining a sequence of XSLT processes together. The requirement to chain multiple XSLT processes together implicitly means that a new document is created for each step, which accordingly typically incurs an associated large amount of overhead. Additionally, XSLT typically requires learning of an entirely new language, by a developer, with little inherent support for debugging or logging.

BRIEF SUMMARY

According to one embodiment, a computer-implemented process for tree structured data transformation receives tree structured data as input, and responsive to a determination that the predicate of a rule matches the given node, applies a function of an identified rule to the node to generate a compound result and an interim mutated output document and responsive to a determination that the compound result contains a next node, determines whether the next node is compared with the predicate of a next rule. Responsive to a determination that the next node is processed by a next rule, the computer-implemented process uses the interim mutated output document as input and determines whether a predicate of a rule matches a given node in a set of nodes. Responsive to a determination that the predicate of a rule matches the given node, a function of an identified rule is applied to the node to generate a compound result and mutated document and responsive to a determination that the compound result does not contain a next node, a final mutated output document is generated.

According to another embodiment, a computer program product for tree structured data transformation includes a computer recordable media containing computer executable program code stored thereon. The computer executable program code includes computer executable program code for receiving tree structured data as input, computer executable program code for determining whether a predicate of a rule matches a given node in a set of nodes, computer executable program code responsive to a determination that the predicate of a rule matches the given node, for applying a function of an identified rule to the node to generate a compound result and an interim mutated output document, computer executable program code for determining whether the compound result contains a next node, computer executable program code responsive to a determination that the compound result contains a next node, for determining whether the next node is compared with the predicate of a next rule, computer executable program code responsive to a determination that the next node is processed by a next rule, for using the interim mutated output document as input, computer executable program code for determining whether a predicate of a rule matches a given node in a set of nodes, computer executable program code responsive to a determination that the predicate of a rule matches the given node, for applying a function of an identified rule to the node to generate a compound result and mutated document and computer executable program code responsive to a determination that the compound result does not contain a next node, for generating a final mutated output document.

According to another embodiment, an apparatus for tree structured data transformation includes a communications fabric, a memory connected to the communications fabric, wherein the memory contains computer executable program code, and a processor unit connected to the communications fabric. The processor unit executes the computer executable program code to direct the apparatus to receive tree-structured data as input, determine whether a predicate of a rule matches a given node in a set of nodes, responsive to a determination that the predicate of a rule matches the given node, apply a function of an identified rule to the node to generate a compound result and an interim mutated output document, determine whether the compound result contains a next node, and responsive to a determination that the compound result contains a next node, determine whether the next node is compared with the predicate of a next rule, and responsive to a determination that the next node is processed by a next rule, use the interim mutated output document as input, determine whether a predicate of a rule matches a given node in a set of nodes, and responsive to a determination that the predicate of a rule matches the given node, apply a function of an identified rule to the node to generate a compound result and mutated document and responsive to a determination that the compound result does not contain a next node, generate a final mutated output document.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 5 is a pseudo code representation of the process logic of the transform system of FIG. 3 in accordance with one embodiment of the disclosure;

FIG. 6 is a textual representation of a code snippet using the transform system of FIG. 3 in accordance with one embodiment of the disclosure.

DETAILED DESCRIPTION

Figure 1:
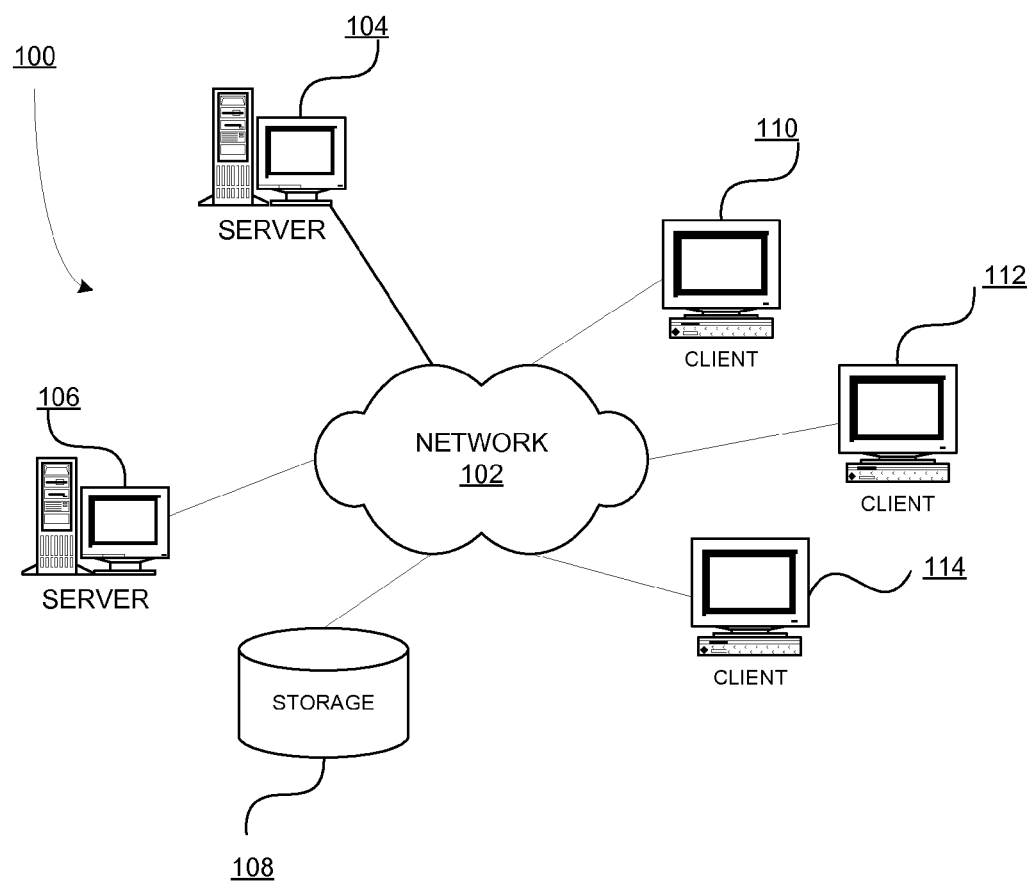
FIG. 1 is a block diagram of an exemplary network data processing system operable for various embodiments of the disclosure.

This disclosure relates generally to data transformation in a data processing system and more specifically to tree structured data transformation in the data processing system.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
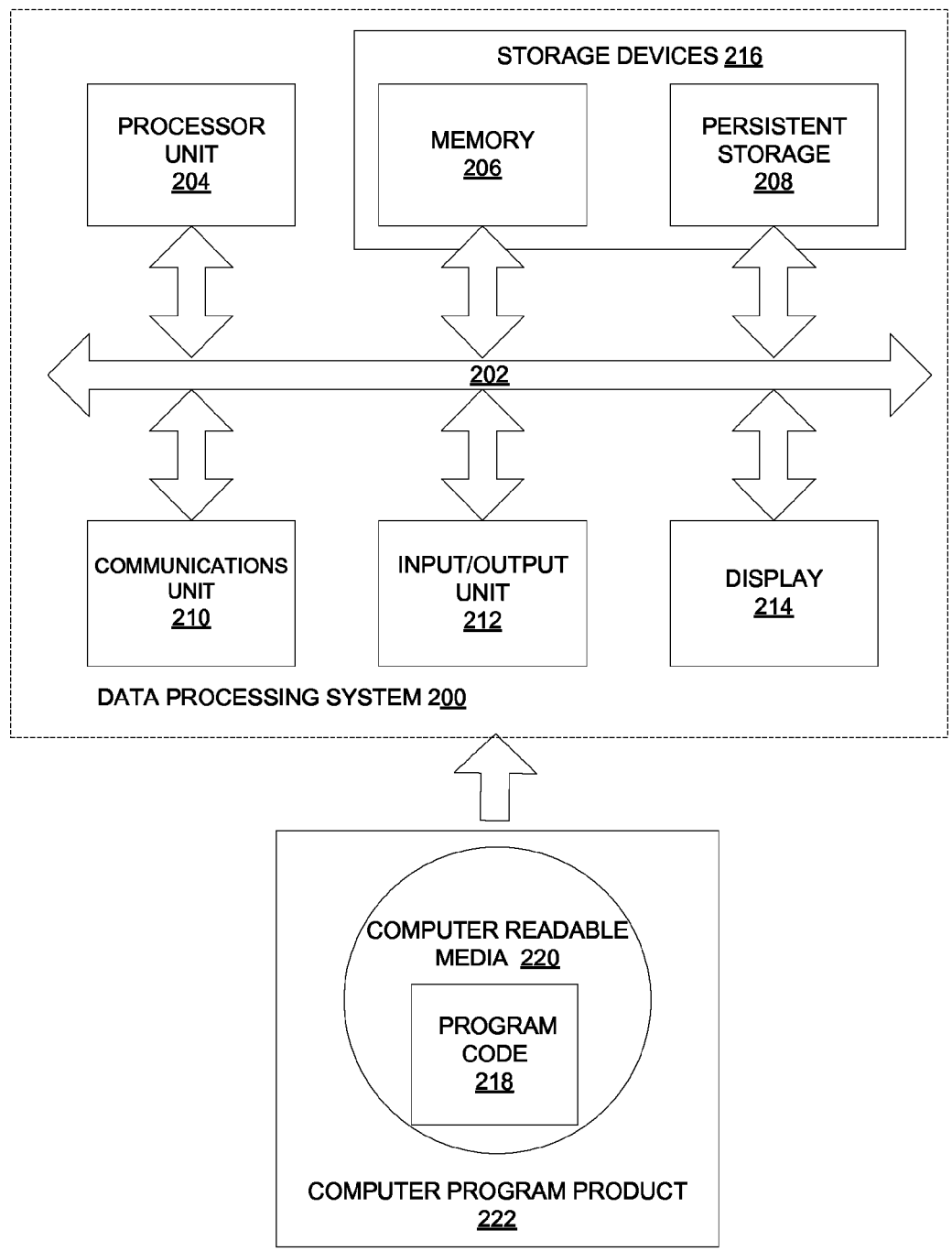
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for tree structured data transformation is presented. An embodiment of the disclosed process provides a capability of a generic, recursive XML transformation engine. In an embodiment the disclosed process recursively applies a set of rules to an input source of a structured tree format, until all of the nodes identified for processing in the input source have been processed. All nodes are not necessarily processed because some nodes may be skipped entirely and therefore left untouched due to conditions specified in the functions associated with some rules. For example, a rule may skip over children of a node entirely by returning a next sibling of the node passed in to the function. Accordingly the disclosed process recursively applies the set of rules to an input source of a structured tree format, until either all of the identified nodes for processing in the input source have been processed or a rule returns no next node, whichever occurs first. A next node is a relative term in that a node, which is processed after a prior node, is not necessarily adjacent to the prior node and is accordingly logically next based on satisfying a condition specified in the previously processed rule. Because the transformation engine is recursive, the output of one rule in the set of rules is typically used as the input for processing by the next rule in the set of rules.

Processor unit 204 receives tree structured data as input from communications unit 210 using network 102 of network data processing system 100 of FIG. 1, input/output unit 212 or storage devices 216, and responsive to a determination that the predicate of a rule matches the given node, processor unit 204 applies a function of an identified rule to the node to generate a compound result and an interim mutated output document and responsive to a determination that the compound result contains a next node, processor unit 204 determines whether the next node is compared with the predicate of a next rule. Responsive to a determination that the next node is processed by a next rule, processor unit 204 uses the interim mutated output document as input and determines whether a predicate of a rule matches the next node in a set of nodes. Responsive to a determination that the predicate of a rule matches the next node, processor unit 204 applies a function of an identified rule to the next node to generate a compound result and interim mutated output document and responsive to a determination that the compound result does not contain a next node, a final mutated output document is generated by processor unit 204.

Figure 3:
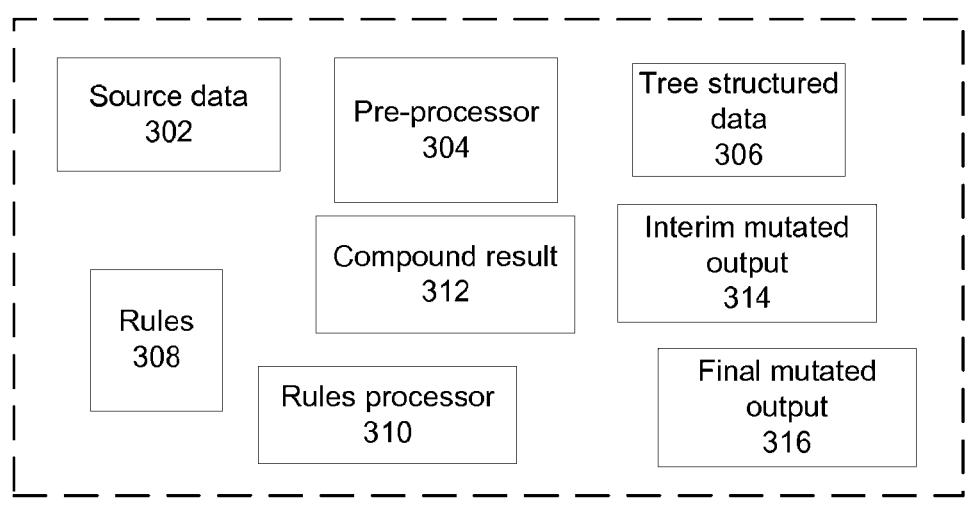
FIG. 3 is a block diagram representation of a transform system operable for various embodiments of the disclosure.

With reference to FIG. 3 a block diagram representation of a transform system operable for various embodiments of the disclosure is presented. Transform system 300 is an example of an embodiment of the disclosure leveraging support of an underlying system such as data processing system 200 of FIG. 3 or server 104 of network data processing system 100 of FIG. 1.

Transform system 300 comprises a number of functional components cooperating to deliver the disclosed capability which may be implemented as physically or logically separate components according to function or combined into a monolithic structure without changing the capability defined. The composition of transform system 300 include a number of components comprising source data 302, pre-processor 304, tree structure data 306, rules 308, rules processor 310, compound result 312, interim mutated result 314 and final mutated result 316.

Source data 302, and pre-processor 304 may be viewed as optional components of transform system 300 because when the input to the disclosed process is provided in a tree structured format these two components are not required. However when input is provided as a markup language source the source must be processed into the tree structured format before further processing can occur. Source data 302 is typically representative of a source form of a document using a markup language, for example XML but other languages could be used equally well, to describe elements and structure of the document. Pre-processor 304 processes input provided as source data 302 into tree structure data 306.

Tree structure data 306 is a data structure comprising a set of nodes arranged in a hierarchical relationship. Using a current example, tree structure data 306 is representative of a document object model or document used in further processing by the disclosed process. A next node in the set of nodes is determined by the function of a rule. For example, a function of a rule could return the node passed in to the rule, a newly created node, or the next node in document order. A next node in one example is the next node in a sequence of the set of nodes indicated in the tree-structured data (document order). In another example, a next node may simply be the node returned by the function and this node may be processed or skipped in accordance with the condition specified in the processing function.

Rules 308 is a set of constructs used to direct processing of tree structure data 306 using rules processor 310. Each rule in the set of rules comprises a predicate portion and a function portion. The predicate portion identifies a node to which an associated function is applied. For example, a predicate defining use of a specific tag is used to filter out nodes, which do not have the specific tag, thereby selecting only those nodes with the specific tag. When the predicate conditions match those of a given node then the function of the rule is applied to the given node, otherwise the function is not applied.

A specific embodiment of a predicate is not defined enabling variations to be used while providing functional equivalence of the disclosed predicate capability. The function portion performs a specific operation by mutating the document of tree structure data 306 as interim mutated output 314 consumed internally by the disclosed process and returning compound result 312.

The set of rules, for example rules 308, is traversed beginning with a first rule, applying the predicate of each rule in the set of rules to the node until a match is identified. When no rules match a given node, processing continues with a next node in the set of nodes of tree structure data 306 (for example, in the document in document order) and the first rule in rules 308.

Compound result 312 includes information in one portion indicating which node to process next (when available). In another portion there is an instruction for rules processor 310 indicating either to continue to process or to break. When the instruction returned in compound result 312 returned by applying the function of the rule is break, rules processor 310 continues processing with the node being the next node returned in compound result 312 returned by applying the function of the rule to the input node.

When the instruction returned in compound result 312 returned by applying the function of the rule is continue, rules processor 310 continues starting from the rule proceeding the matched rule, and uses the next node returned in compound result 312 as the node to match predicates.

Interim mutated result 314 is a portion of the output generated by rules processor 310. Interim mutated result 314 is an instance of mutating tree structure data 306 (the document) in accordance with a specific combination of a previous input and application of a specific rule of rules 308. Intermediate output is used internally as input by the process during processing stages of tree structure data 306 using rules processor 310 until no more nodes remain for processing and final mutated result 316 is accordingly produced.

Final mutated result 316 is a result of processing tree structure data 306 so there are no longer any nodes to process. Final mutated result 316 is the culmination of the application of all of the rules in rules 308 to tree structure data 306 thereby vetting each node using all of the rules to ensure the output is valid according to the rules.

Figure 4:
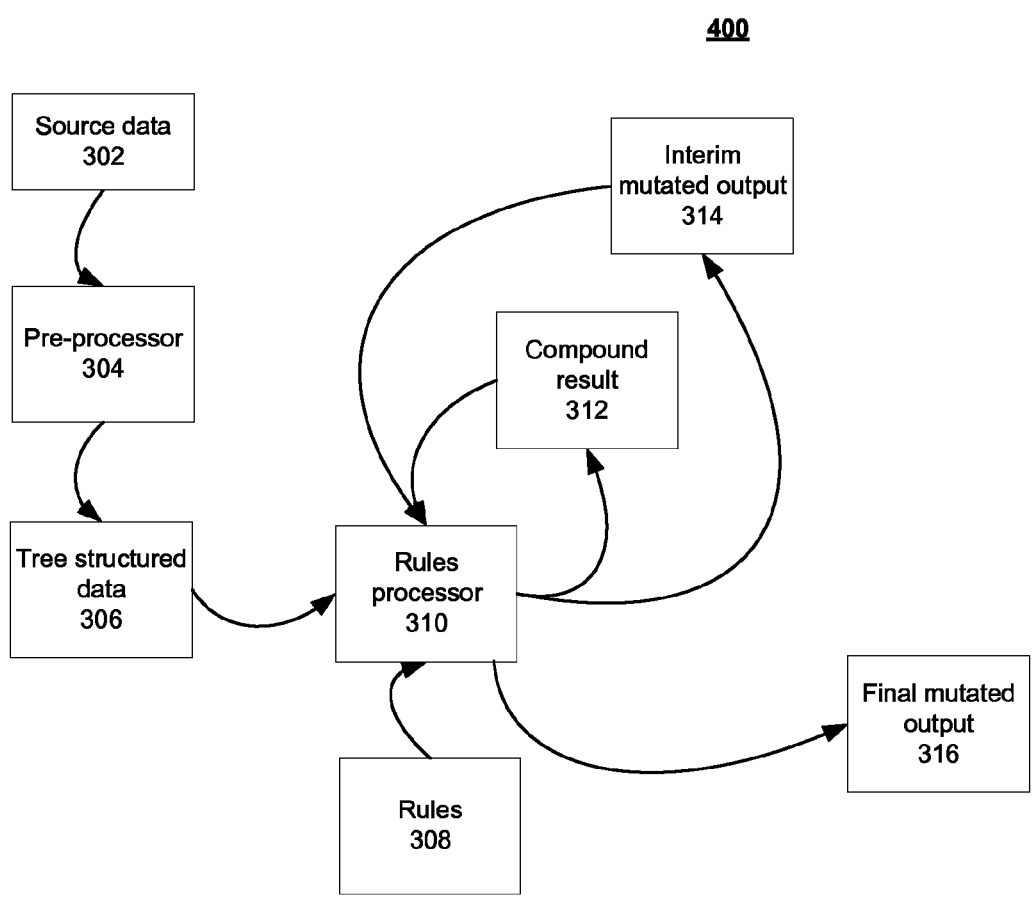
FIG. 4 is a block diagram of data flow of the transform system of FIG. 3 in accordance with one embodiment of the disclosure.

With reference to FIG. 4 a block diagram of data flow of the transform system of FIG. 3 in accordance with one embodiment of the disclosure is presented. Flow 400 is representative of an end-to-end data flow during a process using components of transform system 300 of FIG. 3. In the example of flow 400 use of an XML source is received as source data 302 requiring a transformation using pre-processor 304 into tree structured data 306 (all of FIG. 3) for subsequent processing. Pre-processing may optionally be avoided when input data is available in a tree-structured format.

Rules processor 310 consumes tree-structured data 306 in an iterative procedure by application of rules 308. For example, processing a specific node with an applicable rule produces compound result 312 and interim mutated output 314. Compound result 312 provides an indication of which node to process next. The next node, as indicated in the instance of compound result 312 is not necessarily processed by either a next rule or a first rule in the set of rules 308. Rules processor 310 iteratively compares the predicate portion of the rule against the next node starting with either the next rule or the first rule (as indicated in the instruction). When the next node matches a predicate of a rule, the function of the rule is applied to the node. Accordingly a rule, as applied, may be a next rule or a first rule depending on whether the predicate of the rule matches the node. Interim mutated output 314 is further only used internally as input for a next cycle of rules processor 310 (all of FIG. 3).

Final mutated output 316 is produced through selective application of all rules to all nodes to ensure a well-formed output is generated. Each rule has been selectively applied to the tree structured data input independent of one another enabling a rule to provide an incremental change to a respective node during traversal of the tree structured data input.

With reference to FIG. 5 is a pseudo code representation of the process logic of the transform system of FIG. 3 in accordance with one embodiment of the disclosure is presented. Process logic 500 is a general example of code used to define a method using rules processing in transform system 300 of FIG. 3. The sample pseudo code is representative of processing a list of rules against a node in a set of nodes in the example of a document representative of tree-structured data 306 of FIG. 3.

Statement 502 represents a definition of a node as being an element within a document as typically found when using an XML source input. Statement 504 indicates each rule in a set of rules, for example rules 308 of FIG. 3, has a set of logic of the remaining statements applied. Statement 506 indicates use of a filter to determine whether a predicate matches a node. Each rule in the process has two parts including a predicate, and a function. The predicate indicates to which node a function should be applied by conforming to a conditional match between the predicate and the node. The function only performs an operation, on the node when the predicate matches the node, by mutating the document and returns a compound result as indicated in statement 508.

The compound result includes two parts comprising a node to process next and an instruction to the rules processor indicating continue or break. Statement 510 indicates a break in loop processing occurs. Break indicates that processing of the next node should begin from the beginning of the set of rules. Statement 512 indicates a continuation of the rules processing being applied to a next node. Continue indicates the next node should be processed by the next rule in the set of rules.

The output of applying a rule is used to determine the next node to process. When a rule matches a node, a location within the document at which processing should continue is determined by the function of the rule being processed. A rule could unilaterally decide processing should stop and return no next node when predetermined criteria are met. When all of the nodes identified for processing have been processed, for example, when there is no next node returned from any rule, processing is complete. By default, when no rules match a given node then the next node in document order is used and processing begins with the first rule.

The disclosed does not specify syntax for predicates because the format is an arbitrary decision. Predicate syntax could be specified in a number of ways including XPath, cascading style sheet (CSS) selectors, or program code.

With reference to FIG. 6 a textual representation of a code snippet using the transform system of FIG. 3 in accordance with one embodiment of the disclosure is presented. Code snippet 600 is an example using CSS selector syntax with pseudo code being an implementation language.

In the example of FIG. 6, statements 602, 608, and 610 are comments indicating what a rule does, in each respective case, in the lines following. A predicate and a function for each rule are separated by a ":". For example in the first rule associated with statement 602 "*[style]" is the predicate and the function is a remaining portion of the line and the ensuing indented lines containing pseudo-code of statements 604 and 606.

In a simple example of transform system 300 of FIG. 3 all nodes that are not understood may be filtered. For example statement 602 indicates in the comment the purpose of the code snippet is to remove all CSS styling from all nodes. Statement 604 indicates removal of a style attribute of node n. Statement 606 indicates a result of the previous instruction in the form of a compound result in the form of a node of: n, and an instruction of: continue. In this example all nodes have a respective style attribute removed and processing continues. Accordingly this rule acts like a filter.

Statement 608 indicates in the comment a purpose of a rule for acceptance of elements comprising elements of <a>, <b>, <i>, <u>, and <p>. During processing, whenever an <a>, <b>, <i>, <u>, or <p> element is encountered the element is retained in the document and processing moves on to a next node in document order. When a <div> element is encountered the <div> element is transformed into a <p> element as indicated in a comment of statement 610. Notice however, that with this rule the rules process is instructed to continue processing against the newly created <p> element as in statement 612.

For example, a <div style=""> element would be processed by the rules as follows: when the current node being processed is a <div style=""> and the current node is matched the associated style attribute is removed. Since statement 606 indicates processing should continue with the next rule, statement 608 is consulted. At this point the <div style=""> element has been transformed into <div>. The predicate of the statement following statement 608 does not match <div> elements therefore the rule is not applied. The rules processor then checks the next rule, associated with statement 610. Because the predicate for the rule associated with the comment of statement 610 matches <div> elements the function is applied. The function effectively transforms the <div> into a <p> and returns the <p> element along with an instruction of break to the rules processor.

The rules processor then begins processing the <p> element (the next element from applying the rule associated with statement 610) starting from the first rule. The rule associated with statement 602 is checked first, but since the style attribute was removed previously the predicate does not match and the rules processor moves on to the next rule associated with statement 608. The predicate for the rule associated with statement 608 matches for <p> elements so the function is applied. The function accepts the node by specifying the rules processor to process the next node in document order starting from the first rule. At this point the <div style=""> element has been transformed into <p> and processing continues with the children of <p> if there are any, or <p>'s next sibling if there is one. When <p> has no children and no siblings then the next node is null and the rule processor is finished processing the document.

As previously stated, when a rule matches a node, a location within the document at which processing should continue is determined by the function of the instant rule being processed. For example, a function of a rule could return the node passed in to the rule as in the rule associated with statement 602, a newly created node as in the rule associated with statement 612, or the next node in document order as in the rule associated with statement 608.

Constructing a rules processor in this way enables each of the rules to work independently of other rules whereby each rule performs small, incremental changes to the document. When all of the rules are thus aggregated a transformation from one document form to another document form ensures a well-formed output of each rule is used as input for another rule. Because each node must be vetted by all of the rules in the set of rules the final output document created is guaranteed to be valid according to the set of rules.

Figure 7:
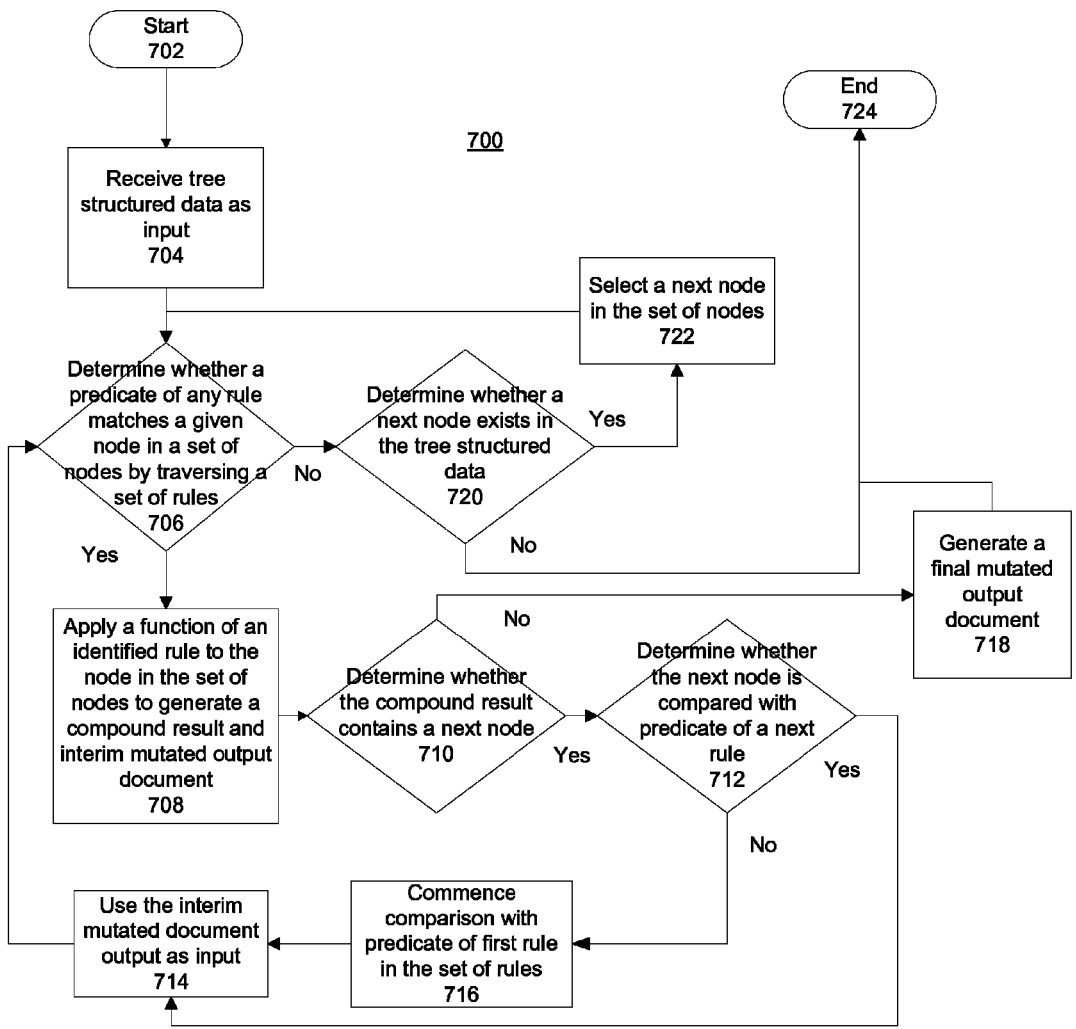
FIG. 7 is a flowchart of a process using the transform system of FIG. 3 in accordance with one embodiment of the disclosure.

With reference to FIG. 7 a flowchart of a process using the transform system of FIG. 3 in accordance with one embodiment of the disclosure is presented. Process 700 is an example of using transform system 300 of FIG. 3.

Process 700 begins (step 702) and receives tree-structured data as input (step 704). As previously stated when markup language source is used the data is prepared for the instant process by a pre-process operation to create tree-structured data. When this pre-process operation is performed such an operation is outside of the scope of the instant process and is considered an option as whether the pre-process operation is implemented within or outside of the instant process. In the example used, tree structured data is representative of a document comprising a set of nodes wherein the set comprises one or more nodes.

Process 700 determines whether a predicate of a rule matches a given node in a set of nodes by traversing a set of rules (step 706). Process 700 determines whether a match to the rule exists a single node at a time. The set of nodes is contained within the previously received tree structured data (document) provided as input. When a determination is made that the predicate of any rule does not match a given node in the set of nodes, process 700 determines whether a next node exists in the tree-structured data (step 720). Each rule is consulted until a rule having a predicate that matches the current node is identified. When there are no rules with a predicate matching the current node then processing continues with the next node in document order starting with a comparison of the first rule. When there is no next node requiring processing, processing is complete.

When a determination is made that a next node exists in the tree-structured data, process 700 selects the next node in the set of nodes (step 722). Identification of a next node is determined by the function of the rule. For example, as previously indicated a function of a rule could return the node passed in to the rule, a newly created node, or the next node in document order. Process 700 returns to perform step 706 as before. When a determination is made that a next node does not exist in the tree-structured data, processing of the tree-structured data cannot complete and process 700 terminates (step 724).

When a determination is made that the predicate of a rule does match a given node in a set of nodes, process 700 applies a function of an identified rule to the node in the set of nodes to generate a compound result and interim mutated output document (step 708). The function applied is identified in a portion of the applicable rule. The interim mutated output document is an interim result only and used as input in a subsequent cycle of the instant process without presentation to a requester of the process.

Process 700 determines whether the compound result contains a next node (step 710). A next node in order, in one example is the next node in a sequence of the set of nodes indicated in the tree-structured data. In another example, a next node may simply be the node returned by the function. When a determination is made that the compound result contains a next node, process 700 determines whether the next node is compared with the predicate of a next rule or another rule in accordance with a predicate of the respective rule (step 712).

When a determination is made that the next node is compared with the predicate of a next rule, process 700 uses the interim mutated output document as input (step 714) and loops back to perform step 706 as before. When a determination is made that the next node is not compared with the predicate of a next rule, process 700 commences comparisons with the predicate of a first rule in the set of rules (step 716). Process 700 performs step 714 as before.

When a determination is made that the compound result does not contain a next node, process 700 generates a final mutated output document (step 718) and terminates thereafter (step 724). Generating a final mutated document in one embodiment may simply avail the final version of the interim output already created and in an alternative embodiment apply additional processing to the previously created last interim output as required.

Thus is presented in an illustrative embodiment a computer-implemented process for tree structured data transformation. The computer-implemented process receives tree structured data as input, and responsive to a determination that the predicate of a rule matches the given node, applies a function of an identified rule to the node to generate a compound result and an interim mutated output document and responsive to a determination that the compound result contains a next node, determines whether the next node is compared with the predicate of a next rule. Responsive to a determination that the next node is processed by a next rule, the computer-implemented process uses the interim mutated output document as input and determines whether a predicate of a rule matches the next node in a set of nodes. Responsive to a determination that the predicate of a rule matches the next node, a function of an identified rule is applied to the next node to generate a compound result and interim mutated output document and responsive to a determination that the compound result does not contain a next node, a final mutated output document is generated.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented process for tree structured data transformation, comprising:
   receiving tree structured data as input, wherein the tree structured data contains a set of nodes;
   determining, using a processor, whether a predicate of a rule matches a given node in the set of nodes;
   responsive to a determination that the predicate of a rule matches the given node, applying a function of an identified rule to the given node to generate a compound result and an interim mutated output document;
   determining whether the compound result contains a next node;
   responsive to a determination that the compound result contains a next node, determining whether the next node is compared with the predicate of a next rule;
   responsive to a determination that the next node is processed by a next rule, using the interim mutated output document as input;
   determining whether a predicate of a rule matches the next node in a set of nodes;
   responsive to a determination that the predicate of a rule matches the next node, applying a function of an identified rule to next node to generate a second compound result and interim mutated output document; and
   responsive to a determination that the compound result does not contain a next node, generating a final mutated output document using the processor, wherein
   the compound results include a node to process next and an instruction indicating continue or break.

2. The computer-implemented process of claim 1, further comprising:
   responsive to a determination that the predicate of a rule does not match the given node whereby no match is identified while traversing a set of rules, determining whether the next node exists in the tree structured data; and
   responsive to a determination that the next node exists in the tree structured data, selecting the next node in the set of nodes.

3. The computer-implemented process of claim 1, wherein the rule contains information including the predicate and a function, wherein the predicate indicates to which node the function is applicable and wherein the function performs an operation by mutating the tree structured data of the document and returning the compound result.

4. The computer-implemented process of claim 1, wherein determining whether the next node is compared with the predicate of a next rule further comprises:
responsive to a determination that the next node is not compared with the predicate of a next rule, identifying a first rule in a set of rules;
using the interim mutated output document as input; and
applying a function of an identified rule to the node to generate a compound result and mutated document.

5. The computer-implemented process of claim 1, wherein the compound result comprises a portion indicating the node to process next and a portion including an instruction indicating processing by comparing a predicate of the next node with one of the next rule and a first rule in a set of rules.

6. The computer-implemented process of claim 1, further comprising:
responsive to a determination that no rules in a set of rules matches a given node, selecting the next node in document order; and
processing the next node commencing with a first rule of the set of rules.

7. The computer-implemented process of claim 1, wherein determining whether a predicate of a rule matches a given node in a set of nodes further comprises:
traversing the set of rules.

8. A computer program product for tree structured data transformation, the computer program product comprising:
a computer recordable media containing computer executable program code stored thereon, the computer executable program code comprising:
computer executable program code for receiving tree structured data as input;
computer executable program code for determining whether a predicate of a rule matches a given node in a set of nodes;
computer executable program code responsive to a determination that the predicate of a rule matches the given node, for applying a function of an identified rule to the node to generate a compound result and an interim mutated output document;
computer executable program code for determining whether the compound result contains a next node;
computer executable program code responsive to a determination that the compound result contains a next node, for determining whether the next node is compared with the predicate of a next rule;
computer executable program code responsive to a determination that the next node is processed by a next rule, for using the interim mutated output document as input;
computer executable program code for determining whether a predicate of a rule matches a next node in a set of nodes;
computer executable program code responsive to a determination that the predicate of a rule matches the next node, for applying a function of an identified rule to the next node to generate a second compound result and interim mutated output document; and
computer executable program code responsive to a determination that the compound result does not contain a next node, for generating a final mutated output document, wherein
the compound results include a node to process next and an instruction indicating continue or break.

9. The computer program product of claim 8, further comprising:
computer executable program code responsive to a determination that the predicate of a rule does not match the given node whereby no match is identified while traversing a set of rules, for determining whether the next node exists in the tree structured data; and
computer executable program code responsive to a determination that the next node exists in the tree structured data, for selecting the next node in the set of nodes.

10. The computer program product of claim 8, wherein the rule contains information including the predicate and a function, wherein the predicate indicates to which node the function is applicable and wherein the function performs an operation by mutating the tree structured data of the document and returning the compound result.

11. The computer program product of claim 8, wherein computer executable program code for determining whether the next node is compared with the predicate of a next rule further comprises:
computer executable program code responsive to a determination that the next node is not compared with the predicate of a next rule, for identifying a first rule in a set of rules;
computer executable program code for using the interim mutated output document as input; and
computer executable program code for applying a function of an identified rule to the node to generate a compound result and mutated document.

12. The computer program product of claim 8, wherein the compound result comprises a portion indicating the node to process next and a portion including an instruction indicating processing by comparing a predicate of the next node with one of the next rule and a first rule in a set of rules.

13. The computer program product of claim 8, further comprising:
computer executable program code responsive to a determination that no rules in a set of rules matches a given node, for selecting the next node in document order; and
computer executable program code for processing the next node commencing with a first rule of the set of rules.

14. The computer program product of claim 8, wherein computer executable program code for determining whether a predicate of a rule matches a given node in a set of nodes further comprises:
computer executable program code traversing the set of rules.

15. An apparatus for tree structured data transformation, the apparatus comprising:
a communications fabric;
a memory connected to the communications fabric, wherein the memory contains computer executable program code; and
a processor unit connected to the communications fabric, wherein the processor unit executes the computer executable program code to direct the apparatus to:
receive tree structured data as input;
determine whether a predicate of a rule matches a given node in a set of nodes;
responsive to a determination that the predicate of a rule matches the given node, apply a function of an identified rule to the node to generate a compound result and an interim mutated output document;
determine whether the compound result contains a next node;

responsive to a determination that the compound result contains a next node, determine whether the next node is compared with the predicate of a next rule;

responsive to a determination that the next node is processed by a next rule, use the interim mutated output document as input;

determine whether a predicate of a rule matches the next node in a set of nodes;

responsive to a determination that the predicate of a rule matches the next node, apply a function of an identified rule to the next node to generate a second compound result and interim mutated output document; and responsive to a determination that the compound result does not contain the next node, generate a final mutated output document, wherein the compound results include a node to process next and an instruction indicating continue or break.

16. The apparatus of claim 15, wherein the processor unit further executes the computer executable program code to direct the apparatus to:

responsive to a determination that the predicate of a rule does not match the given node whereby no match is identified while traversing a set of rules, determine whether the next node exists in the tree structured data; and responsive to a determination that the next node exists in the tree structured data, select the next node in the set of nodes.

17. The apparatus of claim 15, wherein the rule contains information including the predicate and a function, wherein the predicate indicates to which node the function is applicable and wherein the function performs an operation by mutating the tree structured data of the document and returning the compound result.

18. The apparatus of claim 15, wherein the processor unit executes the computer executable program code to determine whether the next node is compared with the predicate of a next rule further directs the apparatus to:

responsive to a determination that the next node is not compared with the predicate of a next rule, identify a first rule in a set of rules;

use the interim mutated output document as input; and apply a function of an identified rule to the node to generate a compound result and mutated document.

19. The apparatus of claim 15, wherein the compound result comprises a portion indicating the node to process next and a portion including an instruction indicating processing by comparing a predicate of the next node with one of the next rule and a first rule in a set of rules.

20. The apparatus of claim 15, wherein the processor unit further executes the computer executable program code to direct the apparatus to:

responsive to a determination that no rules in a set of rules matches a given node, select the next node in document order; and process the next node commencing with a first rule of the set of rules.

* * * * *